US012206461B2

(12) United States Patent
Igarashi et al.

(10) Patent No.: US 12,206,461 B2
(45) Date of Patent: Jan. 21, 2025

(54) OPTICAL FEEDING SYSTEM

(71) Applicant: NIPPON TELEGRAPH AND TELEPHONE CORPORATION, Tokyo (JP)

(72) Inventors: Ryo Igarashi, Musashino (JP); Masamichi Fujiwara, Musashino (JP); Takuya Kanai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 179 days.

(21) Appl. No.: 18/017,879

(22) PCT Filed: Jul. 29, 2020

(86) PCT No.: PCT/JP2020/029097
§ 371 (c)(1),
(2) Date: Jan. 25, 2023

(87) PCT Pub. No.: WO2022/024270
PCT Pub. Date: Feb. 3, 2022

(65) Prior Publication Data
US 2023/0308189 A1    Sep. 28, 2023

(51) Int. Cl.
*H04B 10/80* (2013.01)
(52) U.S. Cl.
CPC ................... *H04B 10/807* (2013.01)
(58) Field of Classification Search
None
See application file for complete search history.

(56) References Cited

U.S. PATENT DOCUMENTS 7,519,241 B2 * 4/2009 Doi ..................... G02F 1/3136
385/40
7,933,517 B2 * 4/2011 Ye .................... H04B 10/07955
398/19

(Continued)

FOREIGN PATENT DOCUMENTS

WO    WO-2018167585 A1 *  9/2018  ........... H04B 10/524

OTHER PUBLICATIONS

P. Lafata et al., "Perspective Application of Passive Optical Network with Optimized Bus Topology", Journal of Applied Research and Technology, vol. 10, No. 3, pp. 340-345, Jun. 2012.

(Continued)

*Primary Examiner* — Jai M Lee

(57) ABSTRACT

There is provided an optical power feeding system including: an optical power feeding unit; and a plurality of drop units configured to be able to receive light from the optical power feeding unit as an input, branch the input light, and output branched light, in which, the optical power feeding unit includes a power-feed light generating unit that outputs power-feed light, and the drop unit includes: an optical splitter that branches the power-feed light into first branch light and second branch light and outputs the second branch light to another drop unit; a photoelectric conversion unit that performs photoelectric conversion of the first branch light; and a branch ratio control unit that is driven by electricity generated by the photoelectric conversion and controls a branch ratio that is a ratio between the first branch light and the second branch light.

6 Claims, 12 Drawing Sheets

(56) References Cited

U.S. PATENT DOCUMENTS

| | | | |
|---|---|---|---|
| 8,145,054 B2 * | 3/2012 | Ye .................... | H04B 10/07955 |
| | | | 398/19 |
| 9,164,242 B1 * | 10/2015 | Li ........................... | G02B 6/34 |
| 11,290,189 B2 * | 3/2022 | Kawakita ............ | H04Q 11/0067 |
| 2003/0095314 A1 * | 5/2003 | Shimada ................ | H04B 10/27 |
| | | | 398/141 |
| 2004/0184696 A1 * | 9/2004 | Miao .................... | G02B 6/2817 |
| | | | 385/11 |
| 2021/0194589 A1 * | 6/2021 | Kawakita ................ | H04L 12/44 |
| 2023/0291484 A1 * | 9/2023 | Igarashi ................ | H04B 10/27 |

OTHER PUBLICATIONS

Z. Yun et al., "A1×2 Variable Optical Power Splitter Development", J. Lightw., Technol. vol.24, No. 3, pp. 1566-1570, Mar. 2006.
H. Ramanitra et al., "Optical access network using a self-latching variable splitter remotely powered through an optical fiber link", Optical Engineering, vol. 46 (4), Apr. 2007.

* cited by examiner

FIG. 7

| CHARGING RATE [%] OF CHARGING UNIT 126 | $T_1$ |
|---|---|
| 0-30 | NO CONTROL |
| 30-40 | 0.4 |
| 40-60 | 0.3 |
| 60-80 | 0.2 |
| 80-100 | 0.1 |
| 100 | 0.05 (LOWER LIMIT VALUE) |

OPTICAL FEEDING SYSTEM

CROSS-REFERENCE TO RELATED APPLICATIONS

This application is a 371 U.S. National Phase of International Application No. PCT/JP2020/029097, filed on Jul. 29, 2020. The entire disclosure of the above application is incorporated herein by reference.

TECHNICAL FIELD

The present invention relates to an optical feeding system.

BACKGROUND ART

As a scheme of optical communication, there is a passive optical network (PON). In optical communication using a PON, an optical line terminal (OLT) installed on a station side of a communication company and an optical network unit (ONU) installed on a subscriber's house side are connected by an optical fiber. An optical splitter is provided in the middle of the optical fiber, and the optical splitter separates and synthesizes optical signals transmitted and received between the OLT and the ONU.

FIG. 9 is a diagram illustrating an optical communication system 100.

The optical communication system 100 includes an OLT 90, ONUs 91-1 ... 91-(N+1), symmetrical optical splitters 92-1 ... 92-N, branch fibers 93-1 ... 91-N, and a trunk fiber 94.

In the following description, for matters common to the ONUs 91-1 ... 91-(N+1), parts of the signs of "ONUs 91-1 ... 91-(N+1)" will be omitted, and they will be denoted as "ONU 91." In addition, the "symmetrical optical splitters 92-1, ..., 92-N" and the "branched fibers 93-1, ..., 93-N" are similarly denoted as "symmetrical optical splitter 92" and "branch fiber 93." The OLT 90 is an OLT installed on a station side of a communication company. The ONU 91 is an ONU installed on a subscriber's house side. The symmetrical optical splitter 92 is provided with one input port and two output ports and branches an optical signal input to the one input port and outputs the input optical signal from the two output ports. The intensities of optical signals output from the two output ports are equal. The symmetrical optical splitters 92 are provided on the trunk fiber 94.

The OLT 90 and the ONU 91-(N+1) are connected by a trunk fiber 94. The ONUs 91-1, ..., 91-N are connected to the symmetrical optical splitter 92 provided on the trunk fiber 94 by the branch fibers 93-1, ..., 93-N. The symmetrical optical splitter 92 branches an optical signal (downlink signal) transmitted from the OLT 90 side and outputs the downlink signal branched to the branch fiber 93 and the trunk fiber 94 that are connected. Further, two downlink signals generated as a result of branching the downlink signal using the symmetrical optical splitter 92 are equal in intensity. Therefore, the intensity of the downlink signal generated as a result of the branching of the downlink signal by the symmetrical optical splitter 92 is half the intensity of the downlink signal that is branched. Similarly, the symmetrical optical splitter 92 branches the optical signal transmitted from the ONU 91 and outputs branched uplink signals to the trunk fiber 94. The intensities of the two uplink signals generated as a result of branching of the uplink signal using the symmetrical optical splitter 92 are equal. Therefore, as in the case of the uplink signal, the intensity of the uplink signal generated as a result of branching of the uplink signal using the symmetrical optical splitter 92 is half the intensity of the uplink signal that is branched.

FIG. 10 is a diagram showing the intensities of optical signals received by the ONUs 91-1, ..., 91-3.

In FIG. 10, $P_{tx}$ represents the intensity of an optical signal transmitted by the OLT, $P_{min}$ represents a minimum reception sensitivity required for the ONU 91 to receive an optical signal without error, and $P_1$, $P_2$ and $P_3$ respectively represent intensities of optical signals received by the ONU 91-1, the ONU 91-2, and the ONU 91-3. A transmission distance is a distance between the OLT 90 and each point of the trunk fiber 94.

The graph shown in FIG. 10 is a graph illustrating a relation between a transmission distance and a light intensity when $P_{tx}=+4$ dBm, $P_{min}=-18$ dBM, a transmission loss a of the trunk fiber 14=0.5 dBm/km, a distance D between two nearest symmetrical optical splitters=10 Km, and a distance L of the branch fiber 93=0 km.

Since an optical signal transmitted by the OLT 90 has a loss according to the trunk fiber 14 and is branched by the symmetrical optical splitter 92, the intensity of the optical signal received by the ONU 91 becomes weaker as the transmission distance from the OLT 90 is longer or the number of the symmetrical optical splitters 92 through which the optical signal passes is larger. In FIG. 11, $P_1=-4$ dBm, $P_2=-12$ dBm, and $P_3=-21$ dBm, $P_1$ and $P_2$ are larger than $P_{min}$, and thus the ONU 91-1 and the ONU 91-2 can correctly receive optical signals from the OLT 90. However, since $P_3$ is smaller than $P_{min}$, the ONU 91-3 cannot correctly receive the optical signal from the OLT 90.

As a technique for transmitting an optical signal farther, it has been proposed to use asymmetrical optical splitters of which branch ratio is not symmetrical (for example, Non Patent Literature 1). FIG. 11 is a diagram illustrating an optical communication system 100 including asymmetrical optical splitters 95. The optical communication system 100 shown in FIG. 11 has a configuration in which the symmetrical optical splitters 92 of the optical communication system 100 shown in FIG. 9 are replaced with asymmetrical optical splitters 95. The asymmetrical optical splitter 95 is provided with one input port and two output ports and branches an optical signal input to the one input port and outputs branched optical signals from the two output ports. Unlike the symmetrical optical splitter 92, in the asymmetrical optical splitter 95, the intensities of optical signals output from the two output ports are not necessarily equal to each other.

For example, in the example shown in FIG. 11, the asymmetrical optical splitter 95-1 branches an optical signal transmitted from the OLT 90, outputs an optical signal having an intensity ratio of 2% to the ONU 91-1, and outputs an optical signal having the remaining intensity ratio of 98% to the asymmetrical optical splitter 95-2. The asymmetrical optical splitter 95-2 branches an optical signal transmitted from the OLT 90 side, outputs an optical signal having an intensity ratio of 6% to the ONU 91-2, and outputs an optical signal having the remaining intensity ratio of 94% to the asymmetrical optical splitter 95-3. The asymmetrical optical splitter 95-3 branches an optical signal transmitted from the OLT 90 side, outputs an optical signal having an intensity ratio of 20% to the ONU 91-3, and outputs an optical signal having the remaining intensity ratio of 80% to the asymmetrical optical splitter 95-4.

In the optical communication system 100 shown in FIG. 11, by adjusting the branch ratios such that the intensity of the optical signal output to the trunk fiber 94 by the asymmetrical optical splitter 95 close to the OLT 90 becomes large, the intensity of the optical signal received by the ONU 91 is suppressed from being lowered due to branching of the optical signal transmitted by the OLT 90.

FIG. 12 is a graph showing a relation between a transmission distance and a light intensity in the optical communication system 100 shown in FIG. 11. Conditions other than the branch ratio of the optical splitter in FIG. 12 are the same as those in the graph of FIG. 10, that is, $P_{tx}=+4$ dBm, $P_{min}=-18$ dBm, a transmission loss a of the trunk fiber 14=0.5 dBm/km, a distance D between two nearest symmetrical optical splitters=10 Km, and a distance L between the branch fibers 93=0 km. In FIGS. 12, $P_1=-18$ dBm, and $P_2$ and $P_3$ are also approximately-18 dBm. Therefore, the ONU 91-3 can correctly receive the optical signal from the OLT 90. Further, by lowering the intensity of an optical signal propagating through the branch fiber 94, the intensity of light propagating through the trunk fiber 93 can be relatively increased, and the OLT 90 can transmit the optical signal farther to the ONU 91.

Optimal branch ratios of the asymmetrical optical splitter 95 change according to the number of the ONUs 91 provided in the optical communication system 100, the number of asymmetrical optical splitters 95, the length of the branch fiber 93, and the length of the trunk fiber 94, and when these change, it is preferable to set the branch ratios of the asymmetrical optical splitters 95 again. However, replacement of the asymmetrical optical splitters 95 with optical splitters having different branch ratios each time these are change leads to an increase in maintenance costs. As a means for solving this problem, it is conceivable to use an optical splitter of which a branch ratio can be changed after manufacturing (for example, Non Patent Literature 2) as an asymmetrical optical splitter 95 and to remotely control the branch ratio thereof using a signal from the outside.

Non Patent Literature 3 discloses generating electric energy by converting received light into electricity.

CITATION LIST

Non Patent Literature

[PTL 1] P. Lafata et al., "Perspective Application of Passive Optical Network with Optimized Bus Topology," Journal of Applied Research and Technology", vol. 10, no. 3, pp. 340-345, June 2012.
[PTL 2] Z. Yun et al., "A 1×2 Variable Optical Power Splitter Development," J. Lightw. Technol., vol. 24, No. 3, pp. 1566-1570 March 2006.
[PTL 3] H. Ramanitra et al., "Optical access network using a self-latching variable splitter remotely powered through an optical fiber link," Optical Engineering, Vol. 46 (4), April 2007.

SUMMARY OF INVENTION

Technical Problem

However, in order to control the optical splitter using a signal transmitted from the outside, electric power is required to receive a signal from the outside and change the branch ratio. Therefore, it is necessary to secure a power supply for driving each optical splitter in each optical splitter.

An object of the present invention is to provide an optical feeding system that does not require a power supply installed for each splitter.

Solution to Problem

According to one aspect of the present invention, there is provided an optical feeding system including: an optical power feeding unit; and a plurality of drop units configured to be able to receive light from the optical power feeding unit as an input, branch the input light, and output branched light, in which the optical power feeding unit includes a power-feed light generating unit that outputs power-feed light, and the drop units each include: an optical splitter that branches the power-feed light into first branch light and second branch light and outputs the second branch light to another drop unit; a photoelectric conversion unit that performs photoelectric conversion of the first branch light; and a branch ratio control unit that is driven by electricity generated by the photoelectric conversion and controls a branch ratio that is a ratio between the first branch light and the second branch light.

Advantageous Effects of Invention

According to the present invention, a power supply installed for each splitter is not required.

BRIEF DESCRIPTION OF DRAWINGS

FIG. 7 is a table representing an example of the relation between the transmittance of a first optical splitter for a second optical multiplexer/demultiplexer and the charging rate of a charging unit according to the second embodiment.

DESCRIPTION OF EMBODIMENTS

Hereinafter, embodiments of the present invention will be described in detail with reference to the drawings.

First Embodiment

Figure 1:
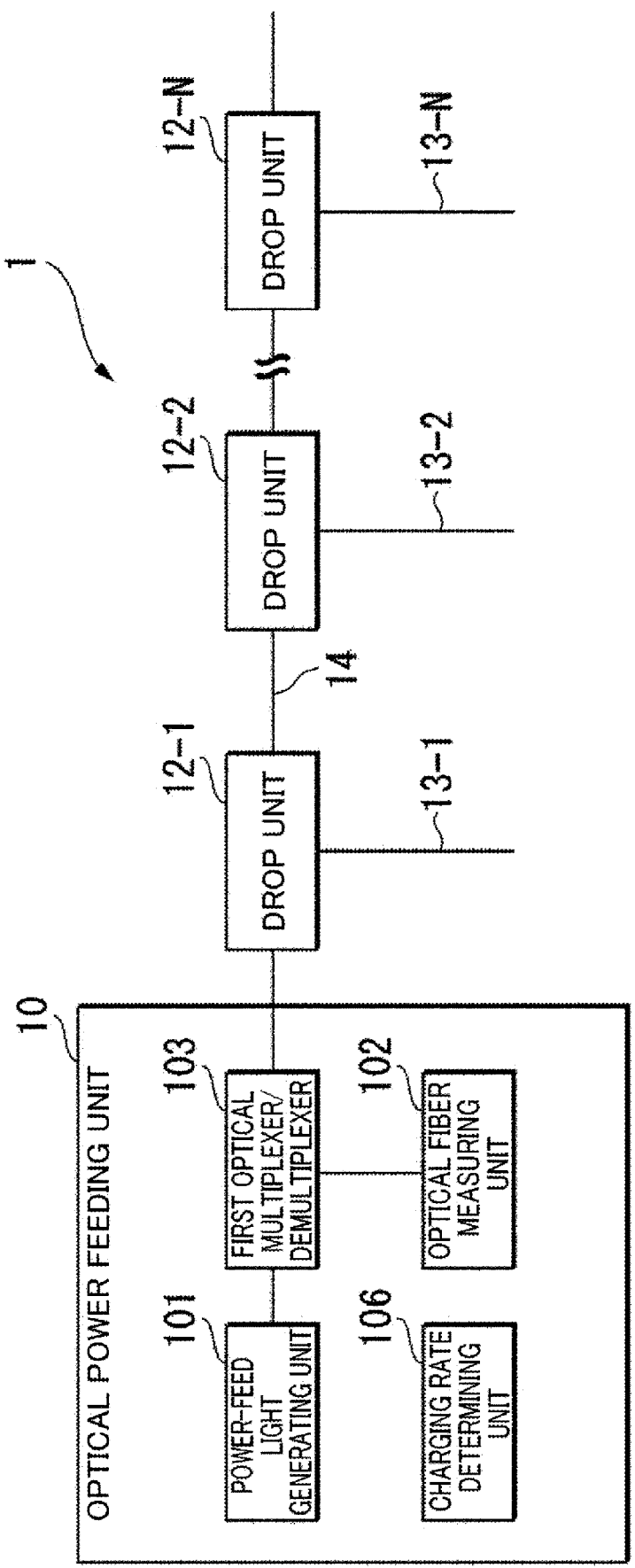
FIG. 1 is a diagram showing the configuration of an optical power feeding system according to a first embodiment.

FIG. 1 is a diagram showing the configuration of an optical power feeding system 1 according to a first embodiment.

The optical power feeding system (optical feeding system) 1 is used for feeding power to an optical communication system used for communication between an OLT and an ONU. The optical communication system configures a tree structure network having an OLT as a root node, a drop unit that branches an optical signal as an intermediate node, and an ONU as a leaf node. The optical power feeding system 1 feeds power to the drop unit 12.

The optical power feeding system 1 includes an optical power feeding unit 10, drop units 12-1, ..., 12-N, branch fibers 13-1, ..., 13-N, and a trunk fiber 14.

In the following description, for matters common to the drop units 12-1, ..., 12-N, parts of reference signs of the "drop units 12-1, ..., 12-N" will be omitted, and they will be denoted as a "drop unit 12." In addition, similarly, "branch fibers 13-1, ..., 13-N" is denoted as "branch fiber 13."

The drop units 12-1, ..., 12-N are provided on the trunk fiber 14. The branch fibers 13-1, ..., 13-N are connected to the drop units 12 provided on the trunk fiber 14. The drop unit 12 branches an optical signal transmitted from the optical power feeding unit 10 side and outputs branched optical signals to the connected branch fiber 13 and the trunk fiber 14. In other words, the optical power feeding system 1 configures a tree structure network having the optical power feeding unit 10 as a root node, the drop units 12-1, ..., 12-(N−1) as intermediate nodes, and the drop unit 12-N as a leaf node. The optical power feeding system 1 is a system that charges batteries included in the drop units 12 by outputting light to the drop units 12. The branch fibers 13 and the trunk fiber 14 included in the optical power feeding system 1 respectively correspond to the branch fibers 93 and the trunk fiber 94 included in the optical communication system 100 shown in FIG. 6. The optical power feeding unit 10 and the drop units 12 included in the optical power feeding system 1 respectively replace the OLT 90 and the asymmetrical optical splitters 95 in the optical communication system 100.

A designer of the optical communication system feeds power to each drop unit 12 by using the optical power feeding system 1, replaces the optical power feeding unit 10 with an OLT, and connects an ONU to an end point of the branch fiber 13 that is connected to the drop unit 12 and an opposite end point thereof, and can thereby build an optical communication system.

As an example of use of the optical power feeding system 1, there is an example of use in which an OLT is provided on the optical power feeding unit 10 side, the trunk fiber 14 is connected to the optical power feeding unit 10 when optical power feeding is performed, and the trunk fiber 14 is connected to the OLT when optical communication is performed.

<Configuration of Optical Power Feeding Unit>

The optical power feeding unit 10 includes a power-feed light generating unit 101, an optical fiber measuring unit 102, a first optical multiplexer/demultiplexer 103, and a charging rate determining unit 106.

The power-feed light generating unit 101 outputs power-feed light to the first optical multiplexer/demultiplexer 103. The optical fiber measuring unit 102 outputs measurement light to the first optical multiplexer/demultiplexer 103 and measures a branch ratio of the drop unit 12. As an example of the optical fiber measuring unit 102, there is an optical time domain reflectometer (OTDR). A wavelength of the power-feed light and a wavelength of the measurement light are different from each other. The first optical multiplexer/demultiplexer 103 multiplexes light input from the power-feed light generating unit 101 and the optical fiber measuring unit 102 and outputs the multiplexed light to the drop unit 12-1. In addition, the first optical multiplexer/demultiplexer 103 demultiplexes light input from the drop unit 12-1 and outputs the demultiplexed light to the power-feed light generating unit 101 and the optical fiber measuring unit 102. The charging rate determining unit 106 determines a charging rate of the power storage unit 126 included in the drop unit 12 on the basis of a measurement result of the optical fiber measuring unit 102.

The drop unit 12 includes an optical splitter and branches input light. The detailed configuration of the drop unit 12 will be described below.

Figure 2:
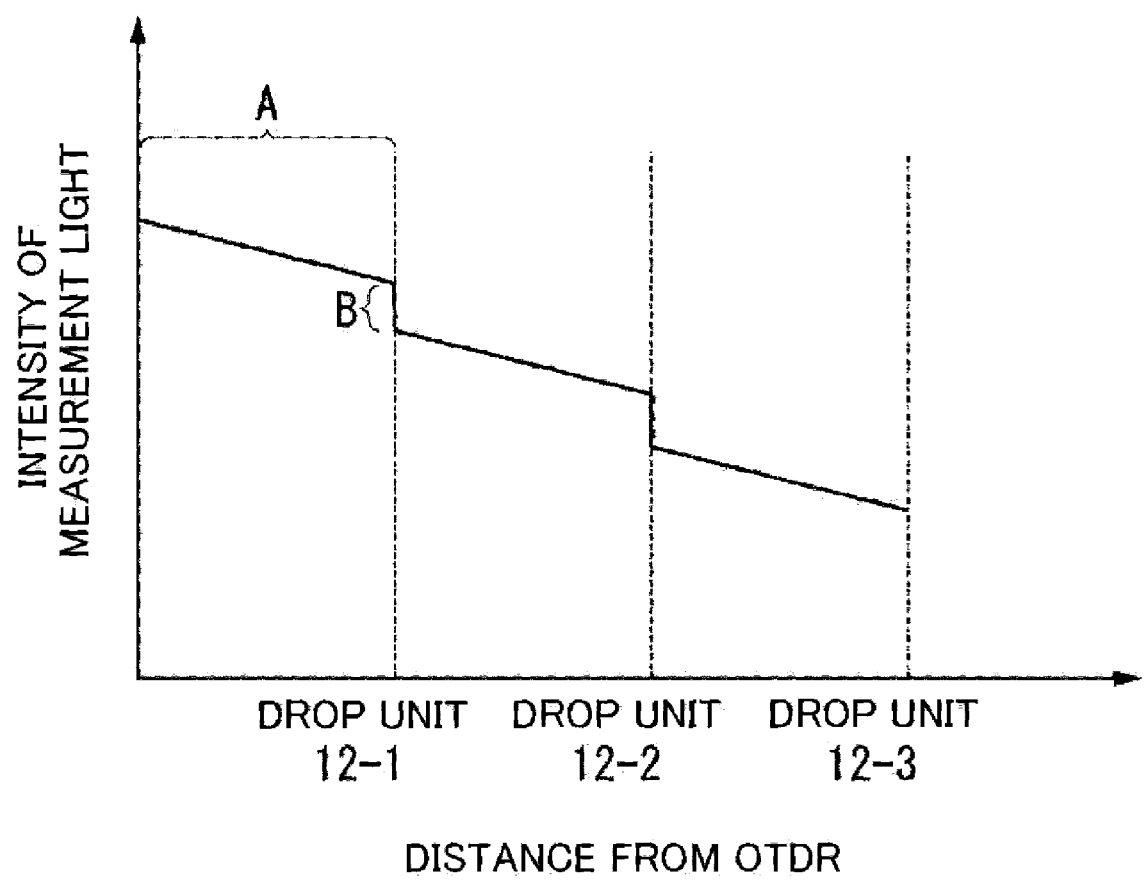
FIG. 2 is an example of a measurement result of a trunk fiber using an OTDR.

Here, measurement using the optical fiber measuring unit 102 will be described. FIG. 2 is an example of a result of measurement of the trunk fiber 14 using the OTDR. In a graph shown in FIG. 2, the horizontal axis represents a distance from the OTDR, and the vertical axis represents the intensity of the measurement light. The OTDR outputs measurement light (an optical pulse signal) and measures backward scattered light that is scattered inside the optical fiber and returns to the OTDR. The OTDR calculates an intensity of the measured light from the intensity of the backward scattered light. The OTDR calculates a distance between a point at which scattering occurs and the OTDR on the basis of a difference between a time at which the measurement light is output and a time at which the backward scattered light is detected.

Light output from the OTDR and propagating through the trunk fiber 14 has a loss caused by the trunk fiber 14 in accordance with the distance. For example, the loss caused by the trunk fiber 14 appears in a part A falling to the right in the graph shown in FIG. 2. Further, the light is branched at the drop unit 12, and some of the light is caused to enter the branch fiber 13. At this branching point, the OTDR observes a loss. The loss caused by the drop unit 12 appears in a part B in which the intensity decreases in parallel with the vertical axis in the graph shown in FIG. 2. In the graph shown in FIG. 2, a local change of the loss appearing in B is caused by the drop unit 12. Therefore, the optical fiber measuring unit 102 can obtain the length of the trunk fiber 14 and a point at which the drop unit 12 is located by referring to the horizontal axis. Further, the optical fiber measuring unit 102 can obtain a branch ratio of the drop unit 12 by measuring an amount of attenuation of the intensity appearing in B.

<Configuration of Drop Unit>

Figure 3:
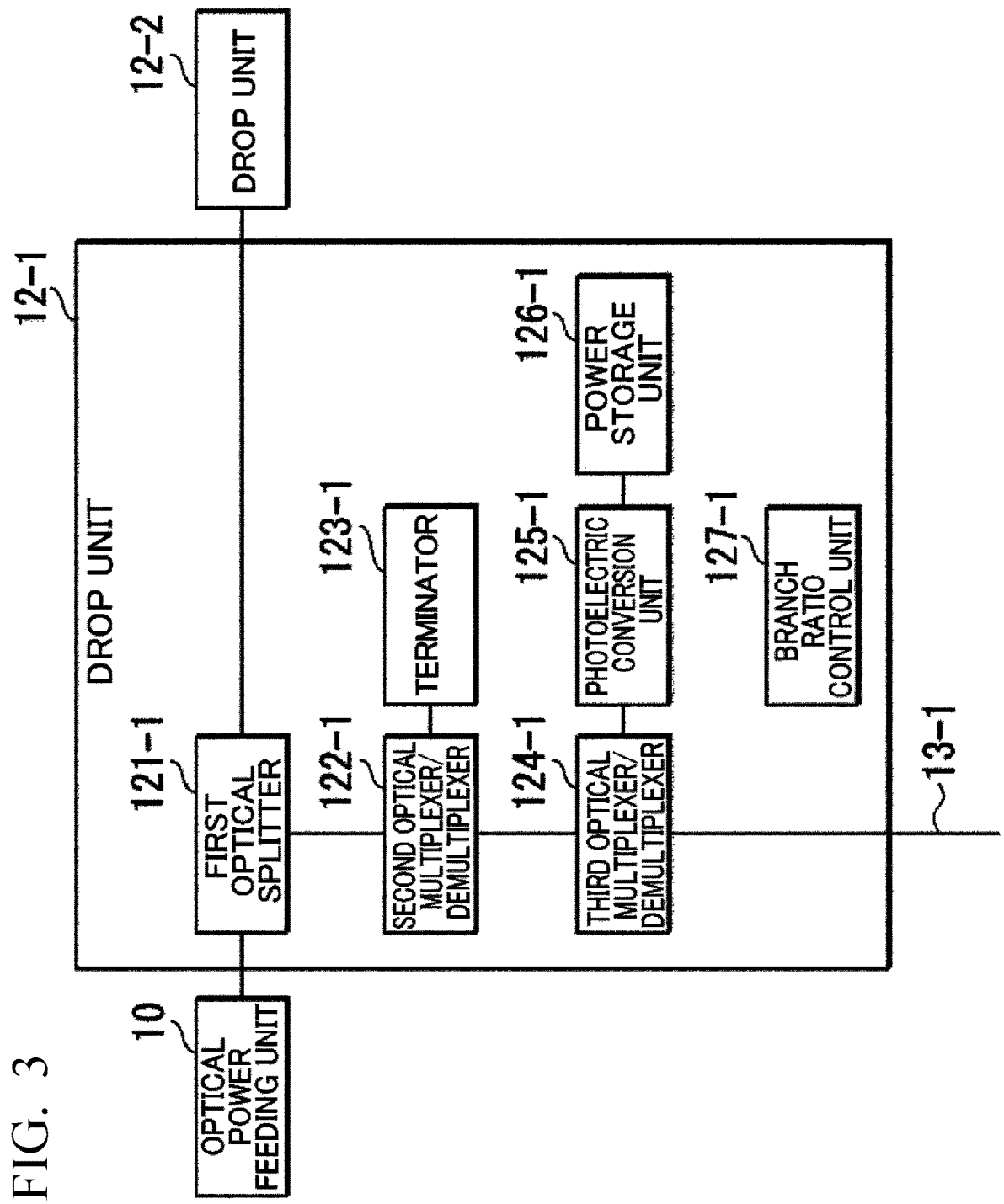
FIG. 3 is a diagram showing the configuration of a drop unit according to the first embodiment.

FIG. 3 is a diagram showing the configuration of the drop unit 12 according to the first embodiment. Here, the drop unit 12-1 includes a first optical splitter 121-1, a second optical multiplexer/demultiplexer 122-1, a terminator 123-1, a third optical multiplexer/demultiplexer 124-1, a photoelectric conversion unit 125-1, a power storage unit 126-1, and a branch ratio control unit 127-1.

The first optical splitter 121-1 branches light input from the optical power feeding unit 10 and outputs branched light to the second optical multiplexer/demultiplexer 122-1 and the drop unit. The transmittance of the first optical splitter 121-1 for the drop unit 12-2 is defined as $S_1$, and the transmittance of the first optical splitter 121-1 for the second optical multiplexer/demultiplexer 122-1 is defined as $T_1$. A sum of the transmittance $S_1$ and the transmittance $T_1$ is 1, and each of $S_1$ and $T_1$ is equal to or larger than 0 and equal to or smaller than 1. The branch ratio of the first optical splitter 121-1 is defined as $S_1:T_1$.

The second optical multiplexer/demultiplexer 122-1 demultiplexes light input from the first optical splitter 121-1 by the wavelength and outputs demultiplexed light to the third optical multiplexer/demultiplexer 124-1 and the terminator 123-1. The second optical multiplexer/demultiplexer 122-1 is designed to output measurement light to the terminator 123-1.

The terminator 123-1 terminates the input measurement light.

The third optical multiplexer/demultiplexer 124-1 demultiplexes light input from the second optical multiplexer/demultiplexer 122-1 by the wavelength and outputs demultiplexed light to the branch fiber 13-1 and the power storage unit 126-1. The third optical multiplexer/demultiplexer 124-1 is designed to output power-feed light to the power storage unit 126-1.

The photoelectric conversion unit 125-1 converts energy of the input light into electric energy. The photoelectric conversion unit 125-1 is, for example, a photodiode. The power storage unit 126-1 stores electric energy generated by the photoelectric conversion unit 125-1. The power storage unit 126-1 is, for example, a rechargeable battery.

The branch ratio control unit 127-1 controls the branch ratio of the first optical splitter 121-1. The branch ratio control unit 127-1 is driven by electric energy charged in the power storage unit 126-1. The branch ratio control unit 127-1 is, for example, a signal generator. The branch ratio control unit 127-1 prevents the transmittance $T_1$ from becoming extremely small by setting a lower limit value L in the transmittance $T_1$ of the first optical splitter 121-1 for the second optical multiplexer/demultiplexer 122-1 in advance. Thus, a power feeding time can be prevented from being increased due to the photoelectric conversion unit 125-1 being unable to generate electric energy.

The second optical multiplexer/demultiplexer 122-1 and the terminator 123-1 are provided in the drop unit 12-1 in order to prevent the optical fiber measuring unit 102 from being unable to measure a distance and a loss of the optical fiber due to scattering of the measurement light in the branch fiber 13-1. Therefore, in a case in which the optical fiber measuring unit 102 can measure a distance and a loss of the optical fiber even if the measurement light is incident in the branch fiber 13-1, the drop unit may not include the second optical multiplexer/demultiplexer 122-1 and the terminator 123-1.

Although the internal configuration of the drop unit 12 other than the drop unit 12-1 is the same as the internal configuration of the drop unit 12-1, a connection relation thereof with the outside is different. For example, the first optical splitter 121-2 provided in the drop unit 12-2 branches light input from the drop unit 12-1 and outputs branched light to the drop unit 12-3 and the second optical multiplexer/demultiplexer 122-2. In the following description, although the branch ratio of the first optical splitter 121 will be described as $S_1:T_1$ for the sake of convenience, this does not mean that the branch ratios of all the drop units 12 are equal. The branch ratio of the first optical splitter 121 may have a different value in accordance with the drop unit 12.

Charging Method According to First Embodiment

Figure 4:
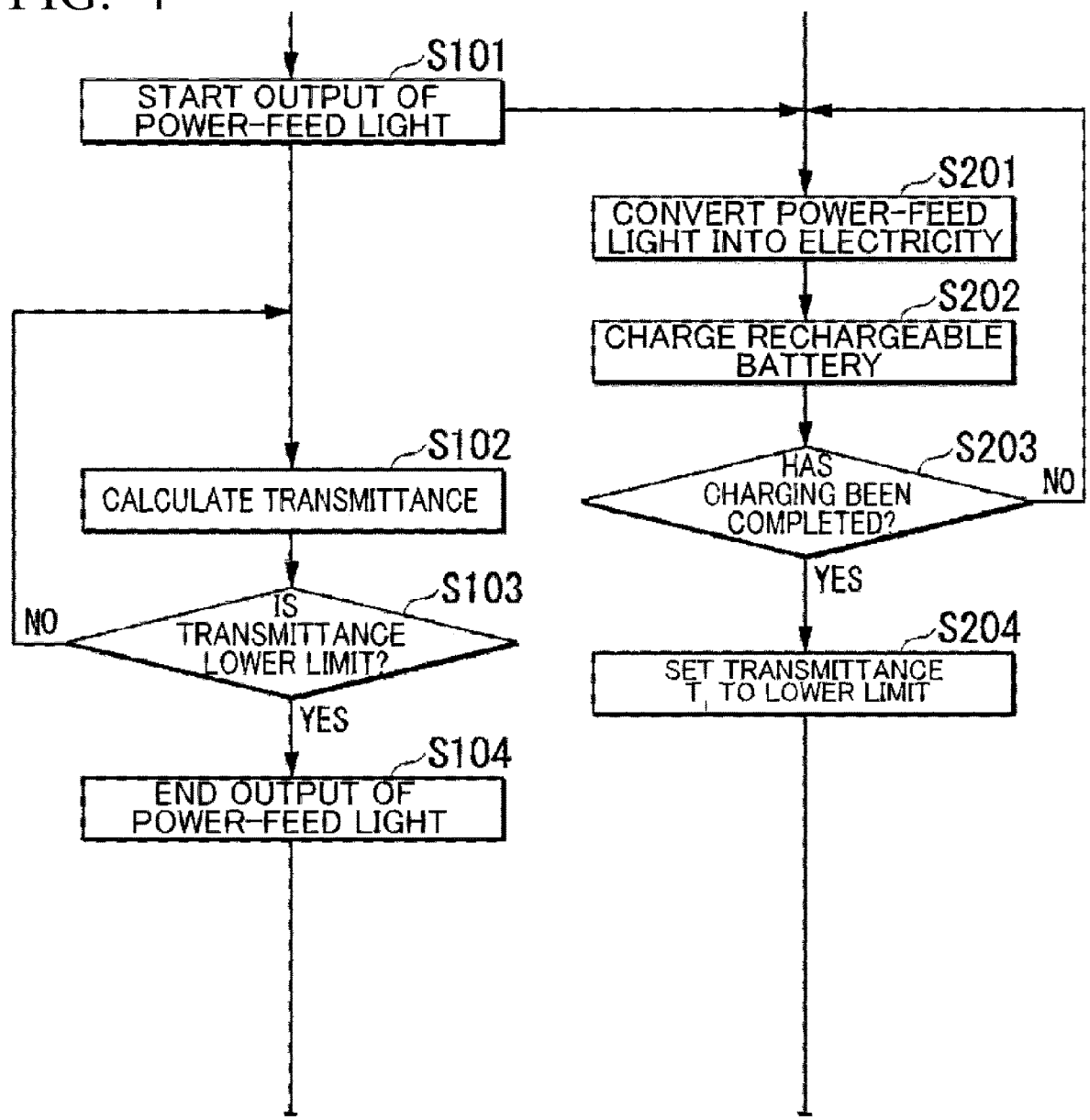
FIG. 4 is a flowchart showing operations of an optical power feeding unit according to the first embodiment.

Next, the operation of the optical power feeding system 1 until the power storage unit 126 is completely charged after the power-feed light generating unit 101 outputs the power-feed light will be described. FIG. 4 is a flowchart showing operations of the optical power feeding system 1 according to the first embodiment. At the time of starting power feeding, the transmittance $T_1$ of the first optical splitter 121 for the second optical multiplexer/demultiplexer 122 in each drop unit 12 takes an arbitrary value not lower than the lower limit value L. First, the power-feed light generating unit 101 outputs power-feed light (step S101). The power-feed light is supplied to each drop unit 12 through the trunk fiber 14. The photoelectric conversion unit 125 of the drop unit 12 converts energy of the power-feed light into electric energy (step S201) and supplies the electric energy to the power storage unit 126. In this way, electricity is stored in the power storage unit 126 (step S202). The branch ratio control unit 127 determines whether or not the charging of the power storage unit 126 is completed (step S203). When the charging of the power storage unit 126 is completed (step S203: Yes), the branch ratio control unit 127 sets the transmittance $T_1$ of the first optical splitter 121 to the lower limit value L (step S204). When the charging of the power storage unit 126 is not completed (step S203: No), the processing is returned to step S201, and the charging using the power-feed light is continued.

When the power-feed light generating unit 101 starts output of the power-feed light in step S101, the optical fiber measuring unit 102 outputs measurement light (step S102). Since wavelengths of the power-feed light and the measurement light are different from each other, feeding using the power-feed light generating unit 101 and measurement using the optical fiber measuring unit 102 can be simultaneously performed. The measurement light is multiplexed with the power-feed light by the first optical multiplexer/demultiplexer 103 and is supplied to the trunk fiber 12. The backward scattered light according to the trunk fiber 12 is separated into backward scattered light of the power-feed light and backward scattered light of the measurement light in the first optical multiplexer/demultiplexer 103. The optical fiber measuring unit 102 calculates the transmittance $T_1$ of the first optical splitter 121 of each drop unit 12 on the basis of the backward scattered light of the measurement light (step S102). The charging rate determining unit 106 determines whether or not the transmittance $T_1$ is the lower limit value L (step S103). For example, the charging rate determining unit 106 determines whether or not a difference between the transmittance $T_1$ and the lower limit value L is less than a predetermined value. In a case in which the calculated transmittance $T_1$ is the lower limit value L (step S103: Yes), the power-feed light generating unit 101 regards that the charging of the power storage unit 126 is completed after a predetermined time and ends the output of the power-feed light (step S104). In a case in which the calculated transmittance $T_1$ is not the lower limit value L (step S103: No), the processing is returned to step S102.

The reason why the power-feed light generating unit 101 waits for a predetermined time in step S104 is that there is a possibility that there is the first optical splitter 121 of which transmittance $T_1$ is set to the lower limit even when charging has not been completed. The predetermined time is a time required until the charging of the power storage unit 126 is completed when the charging of the power storage unit 126 is not completed and is a time determined from the intensity of the power-feed light. Even in a case in which the transmittance $T_1$ is the lower limit value L, the power-feed light generating unit 101 can reliably complete the charging of the power storage unit 126 by continuing to output the power-feed light for a predetermined time. However, the "predetermined time" mentioned here differs depending on the drop unit 12. For example, in a case in which a loss of light between the optical power feeding unit 10 and the drop unit 12 is large, the intensity of the power-feed light incident in the drop unit 12 becomes low, and the "predetermined time" required until the charging of the power storage unit 126 is completed becomes long. In other words, the optical power feeding unit 10 calculates "a predetermined time" required until charging of the power storage unit 126 is completed from a branch ratio of the first optical splitter 121 of each drop unit 12, a loss in the trunk fiber 14, an output intensity of the power-feed light, and the like and determines completion of the charging after waiting for the predetermined time.

In a case in which the optical power feeding system 1 is provided with a plurality of drop units 12, the transmittance $T_1$ of all the drop units 12 is measured, and the output of the power-feed light is continued until the transmittance $T_1$ of all the drop units 12 becomes the lower limit.

After the charging of all the power storage units 126 is completed, the optical power feeding unit 10 is replaced with an OLT, the ONU is connected to an end point connected to the drop unit 12 of the branch fiber 13 and an opposite end point, and thus communication can be performed between the OLT and the ONU.

<Action and Effect>

In this way, according to the first embodiment, the power-feed light generating unit 101 outputs power-feed light and charges the power storage unit 126 of the drop unit 12. When the charging of the power storage unit 126 is completed, the branch ratio control unit 127 sets the transmittance $T_1$ of the first optical splitter 121 for the second optical multiplexer/demultiplexer 122 to the lower limit. By measuring that the transmittance $T_1$ of the first optical splitter 121 is set to the lower limit using the optical fiber measuring unit 102, it is determined whether or not the charging of the power storage unit 126 has been completed. In this way, the branch ratio can be set without installing a power supply in the drop unit 12.

Second Embodiment

In the first embodiment, when charging of the power storage unit 126 is completed, the branch ratio control unit 127 sets the transmittance $T_1$ of the first optical splitter 121 to the lower limit value L. Thereafter, the optical power feeding unit 10 checks that the charging of the power storage unit 126 has been completed by determining whether or not the transmittance $T_1$ is the lower limit value L. In a second embodiment, a branch ratio control unit 127 more flexibly sets the transmittance $T_1$ of a first optical splitter 121 in accordance with the charging rate of a power storage unit 126.

Figure 5:
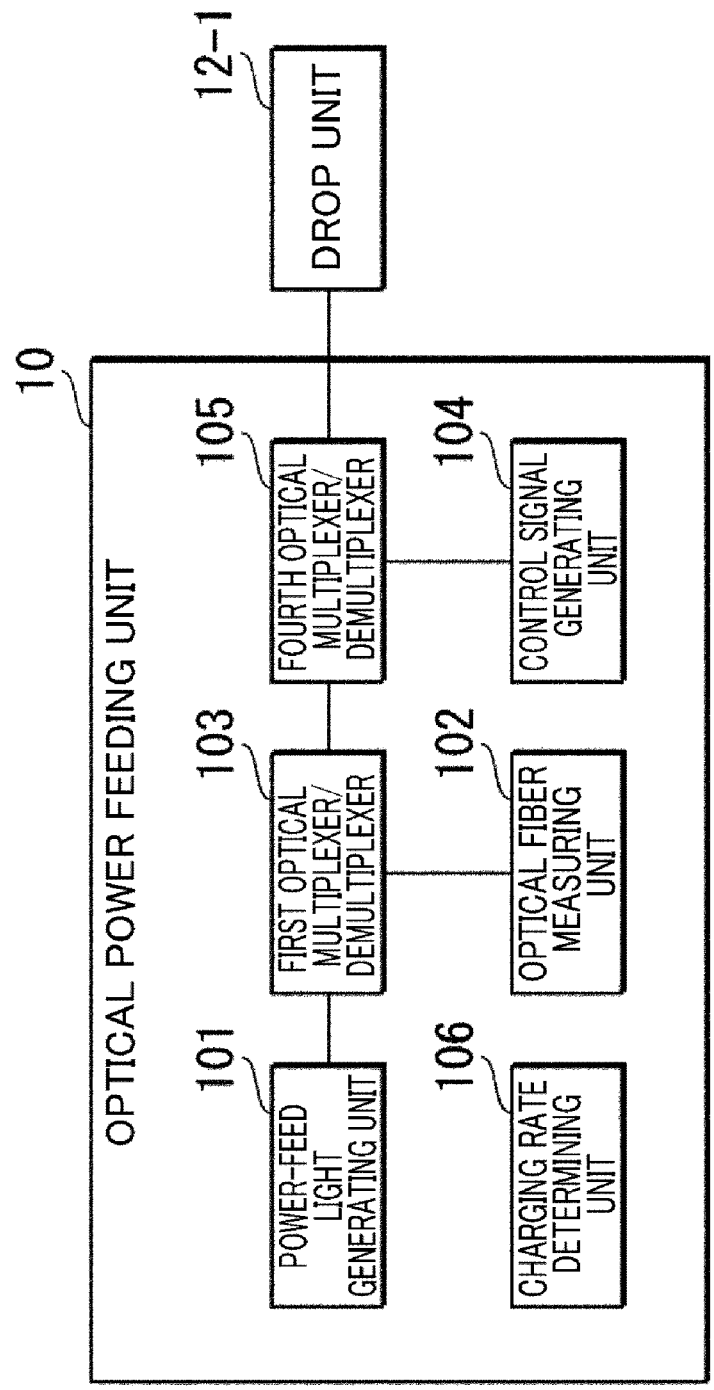
FIG. 5 is a diagram showing the configuration of an optical power feeding unit 10 according to a second embodiment.

FIG. 5 is a diagram showing the configuration of an optical power feeding unit 10 according to the second embodiment. The optical power feeding unit 10 according to the second embodiment includes a control signal generating unit 104 and a fourth optical multiplexer/demultiplexer 105 in addition to the configuration of the optical power feeding unit 10 according to the first embodiment.

The control signal generating unit 104 outputs a control signal for controlling a drop unit 12 to the fourth optical multiplexer/demultiplexer 105.

The fourth optical multiplexer/demultiplexer 105 multiplexes light input from a first optical multiplexer/demultiplexer 103 and light input from the control signal generating unit 104 and outputs multiplexed light to a drop unit 12-1. The fourth optical multiplexer/demultiplexer 105 demultiplexes light input from the drop unit 12-1 and outputs demultiplexed light to the first optical multiplexer/demultiplexer 103 and the control signal generating unit 104. The wavelength of the control signal and the wavelength of the power-feed light are different from each other.

The first optical multiplexer/demultiplexer 103 according to the second embodiment multiplexes light input from the power-feed light generating unit 101 and light input from the optical fiber measuring unit 102 and outputs multiplexed light to the fourth optical multiplexer/demultiplexer 105. In addition, the first optical multiplexer/demultiplexer 103 demultiplexes light input from the fourth optical multiplexer/demultiplexer 105 and outputs demultiplexed light to the power-feed light generating unit 101 and an optical fiber measuring unit 102.

Figure 6:
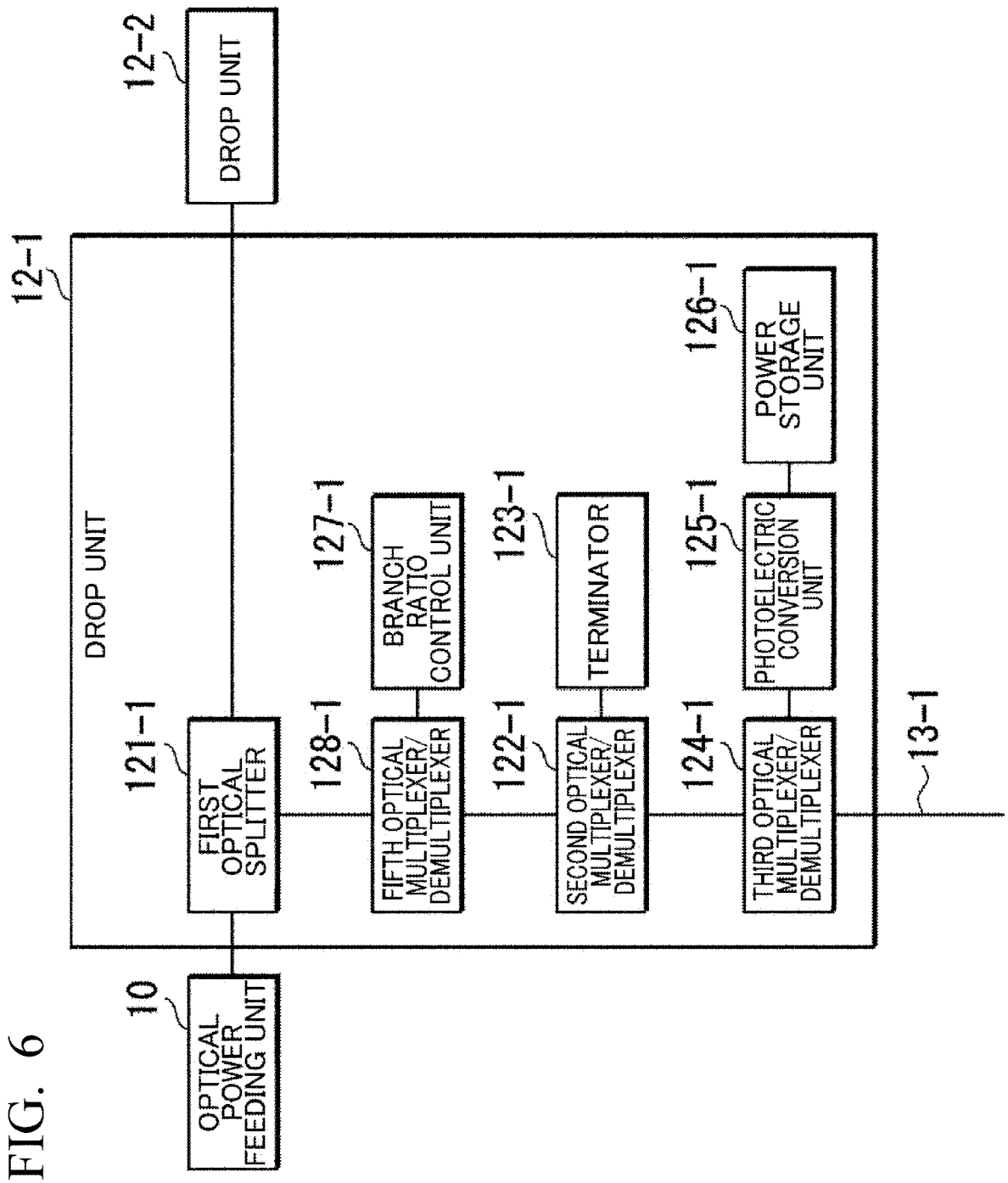
FIG. 6 is a diagram showing the configuration of a drop unit according to the second embodiment.

FIG. 6 is a diagram showing the configuration of the drop unit 12 according to the second embodiment.

The drop unit 12 according to the second embodiment includes a fifth optical multiplexer/demultiplexer 128 in addition to the configuration of the drop unit 12 according to the first embodiment.

The fifth optical multiplexer/demultiplexer 128 is connected to the first optical splitter 121, a second optical multiplexer/demultiplexer 122, and a branch ratio control unit 127. The fifth optical multiplexer/demultiplexer 128 demultiplexes light input from the first optical splitter 121 by the wavelength and outputs demultiplexed light to the second optical multiplexer/demultiplexer 122 and the branch ratio control unit 127. The fifth optical multiplexer/demultiplexer 128 outputs a control signal output from the control signal generating unit 104 of the optical power feeding unit 10 to the branch ratio control unit 127. A control signal is input from a fifth optical multiplexer/demultiplexer 128 to the branch ratio control unit 127 according to the second embodiment.

<Method of Controlling Branch Ratio>

Here, a method of controlling the branch ratio of the first optical splitter 121 using the branch ratio control unit 127 will be described.

The branch ratio control unit 127 is driven by receiving supply of electric power from the power storage unit 126. When the charging rate of the power storage unit 126 is less than a predetermined value (for example, 30%), the branch ratio control unit 127 is not supplied with electric power from the power storage unit 126 and enters a sleep state. On the other hand, when the charging rate of the power storage unit 126 is equal to or higher than the predetermined value, the branch ratio control unit 127 receives supply of electric power from the power storage unit 126 and determines and controls the branch ratio $S_1:T_1$ of the first optical splitter 121 in accordance with the charging rate of the power storage unit 126. In addition, in a case in which the branch ratio control unit 127 is receives supply of electric power, when a control signal for setting a branch ratio is received, the branch ratio is set to a value indicated by the control signal regardless of the charging rate.

In other words, when the charging rate of the power storage unit 126 is equal to or lower than a predetermined value, the branch ratio control unit 127 does not control the branch ratio of the first optical splitter 121. When the charging rate of the power storage unit 126 is equal to or higher than a predetermined value, the branch ratio control unit 127 controls the branch ratio of the first optical splitter 121.

When controlling the branch ratio of the first optical splitter 121 on the basis of the charging rate, the branch ratio control unit 127 further decreases the transmittance $T_1$ from the first optical splitter 121 to the second optical multiplexer/demultiplexer 122 as the charging rate of the power storage unit 126 becomes larger. When the charging of the power storage unit 126 is completed, and the charging rate is 100%, the branch ratio control unit 127 controls the transmittance $T_1$ for the second optical multiplexer/demultiplexer 122 to a minimum value set in advance.

FIG. 7 is a table showing an example of a relation between the transmittance of the first optical splitter 121 for the second optical multiplexer/demultiplexer 122 according to the second embodiment and a charging rate of the power storage unit 126. When the charging rate of the power storage unit 126 is equal to or higher than 0% and lower than 30%, the branch ratio control unit 127 does not control the branch ratio of the first optical splitter 121. When the charging rate of the power storage unit 126 is equal to or higher than 30% to equal to or lower than 100%, the branch ratio control unit 127 controls the branch ratio of the first optical splitter 121 in accordance with the charging rate of the power storage unit 126. When the charging rate of the power storage unit 126 is equal to or higher than 30% and lower than 40%, $T_1$ is controlled to be 0.4. When the charging rate is equal to or higher than 40 and equal to or lower than 60, $T_1$ is controlled to be 0.3. In this way, the branch ratio control unit 127 controls $T_1$ to be a smaller value as the charging rate of the power storage unit 126 increases. When the charging rate of the power storage unit 126 is 100%, $T_1$ is controlled to be a lower limit value (0.05 in FIG. 7) set in advance.

When controlling the branch ratio of the first optical splitter 121 on the basis of a control signal, the branch ratio control unit 127 controls the branch ratio of the first optical splitter 121 for a predetermined time in accordance with a value of the branch ratio indicated by the control signal. When a predetermined time elapses from reception of the control signal, the branch ratio control unit 127 returns the processing to control of the branch ratio based on the charging rate.

However, in a case in which the charging rate of the power storage unit 126 is low, and the branch ratio control unit 127 is not supplied with electric power, the branch ratio of the first optical splitter 121 is not controlled even if a control signal is input to the branch ratio control unit 127.

In the example shown in FIG. 7, when the charging rate of the power storage unit 126 is equal to or higher than 0% and lower than 30%, the branch ratio control unit 127 does not perform control based on the control signal for the branch ratio of the first optical splitter 121 and, when the charging rate is equal to or higher than 30 and equal to or lower than 100%, the branch ratio control unit 127 controls the branch ratio of the first optical splitter 121 based on information of the control signal. The branch ratio control unit 127 receives a control signal, controls the branch ratio of the first optical splitter 121 on the basis of the control signal for a predetermined time, and then controls the branch ratio of the first optical splitter 121 on the basis of the charging rate of the power storage unit 126 again.

In other words, it can be understood that the branch ratio control unit 127 does not control the branch ratio of the first optical splitter 121 unless the branch ratio of the first optical splitter 121 changes when the control signal generating unit 104 transmits two control signals including information of different branch ratios. In other words, it can be understood that the branch ratio control unit 127 is in a sleep state. On the other hand, it can be understood that the branch ratio control unit 127 controls the branch ratio of the first optical splitter 121 if the branch ratio of the first optical splitter 121 changes when the control signal generating unit 104 transmits a control signal including information of different branch ratios. In the observation of a change in the branch ratio using one control signal, there is a possibility that the determination of the charging rate may be incorrect in a case in which a branch ratio set in advance incidentally coincides with the branch ratio according to the control signal.

Charging Method According to Second Embodiment

Figure 8:
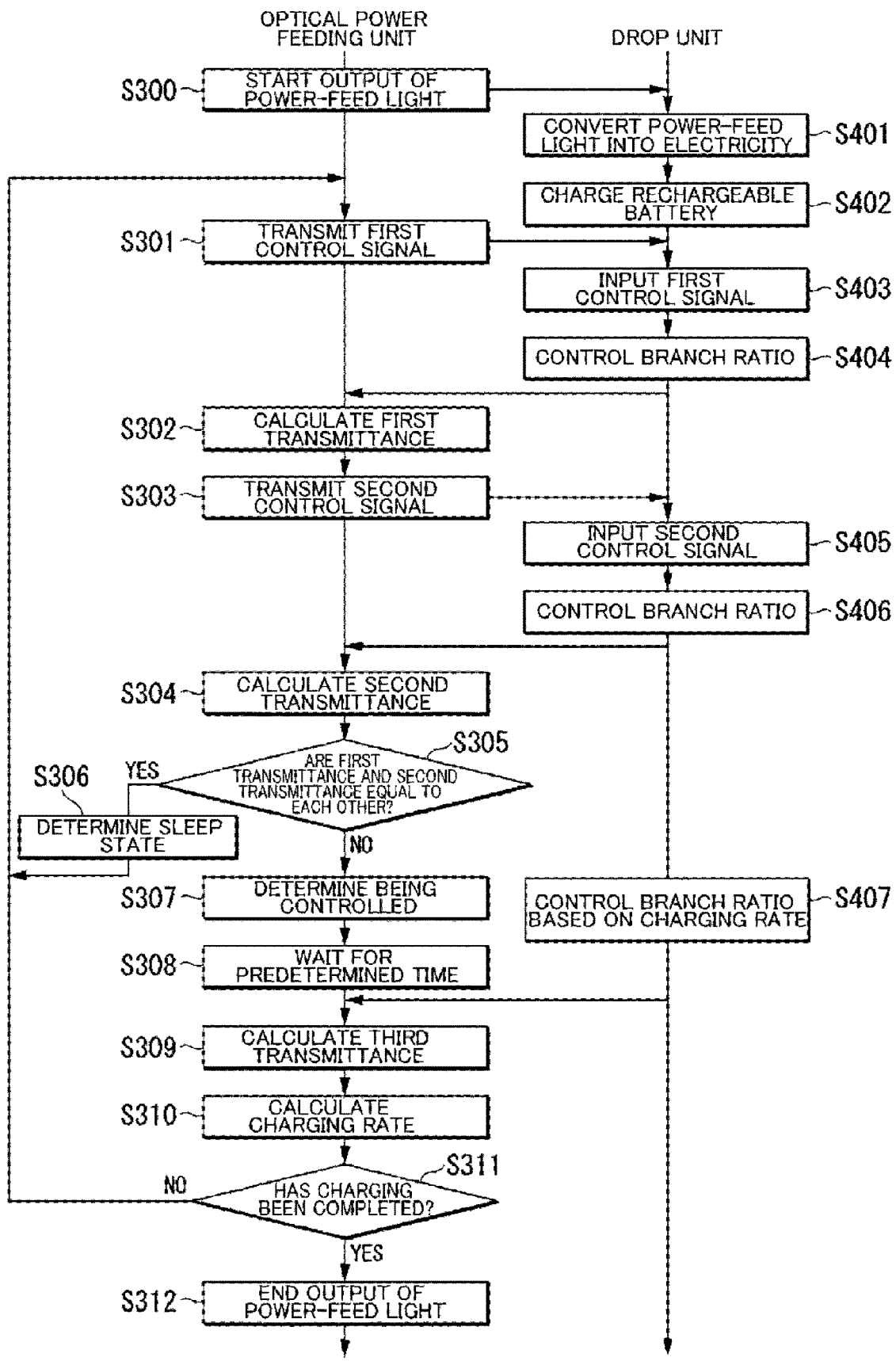
FIG. 8 is a flowchart of operations of an optical power feeding unit according to the second embodiment checking a charging rate of a charging unit.
Figure 9:
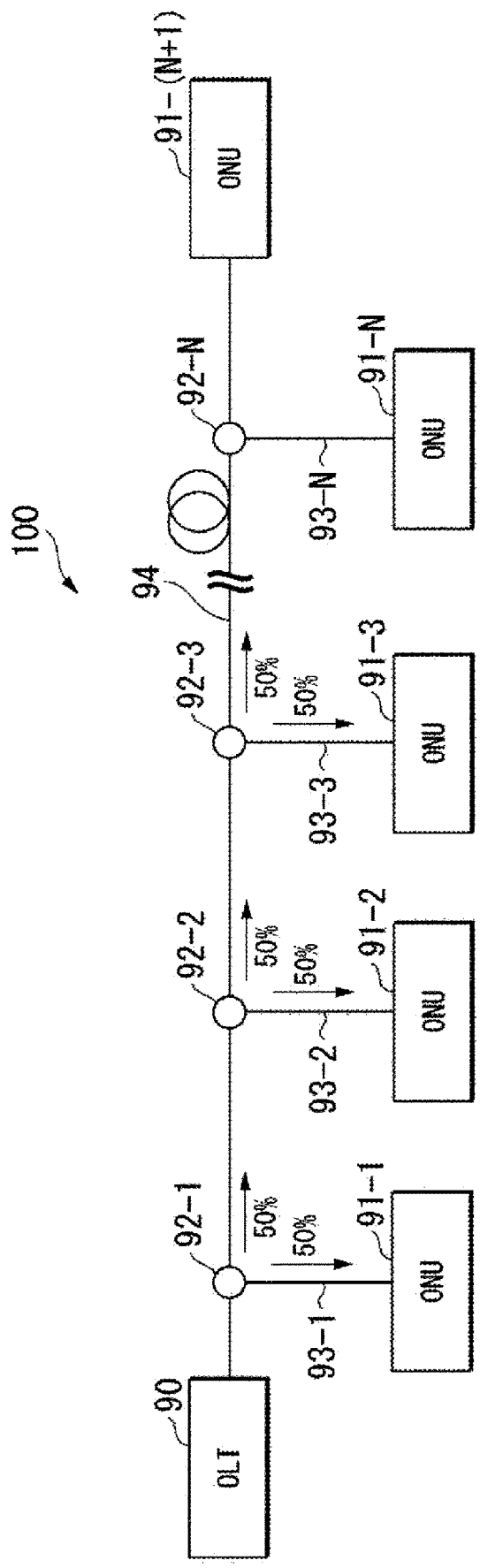
FIG. 9 is a diagram showing an optical communication system.
Figure 10:
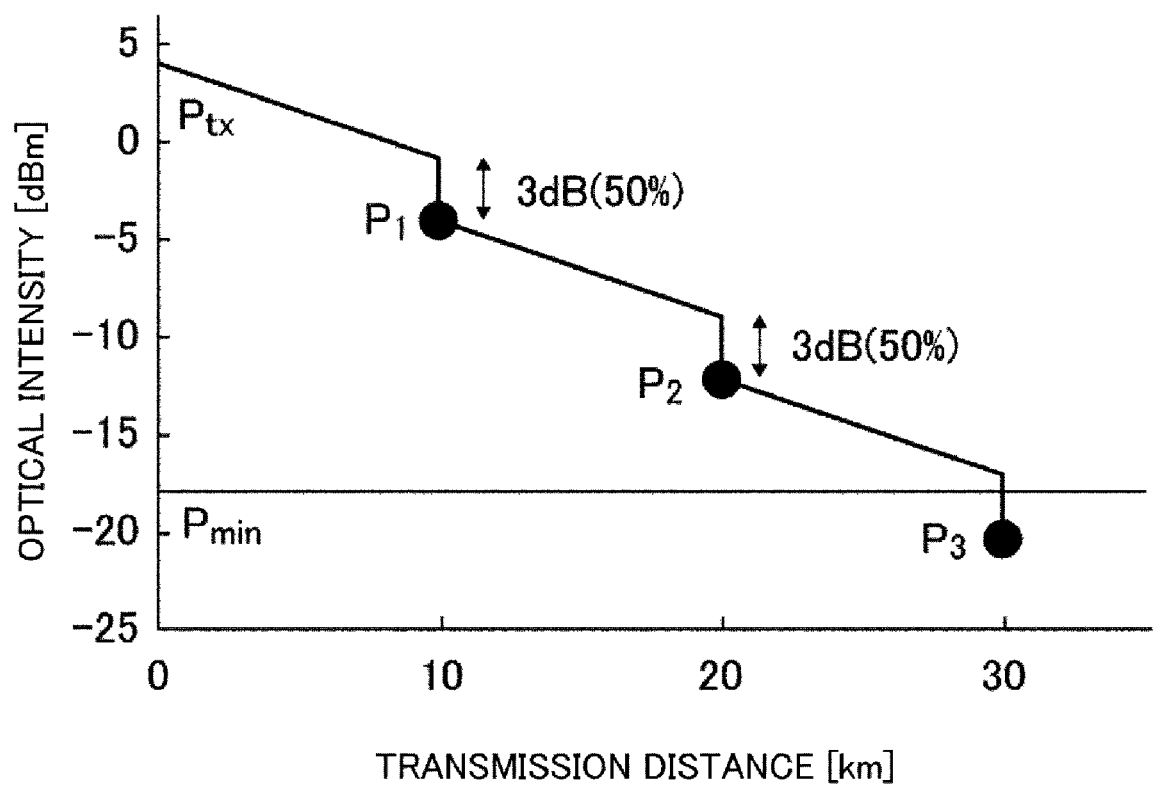
FIG. 10 is a diagram showing the intensity of an optical signal received by an ONU.
Figure 11:
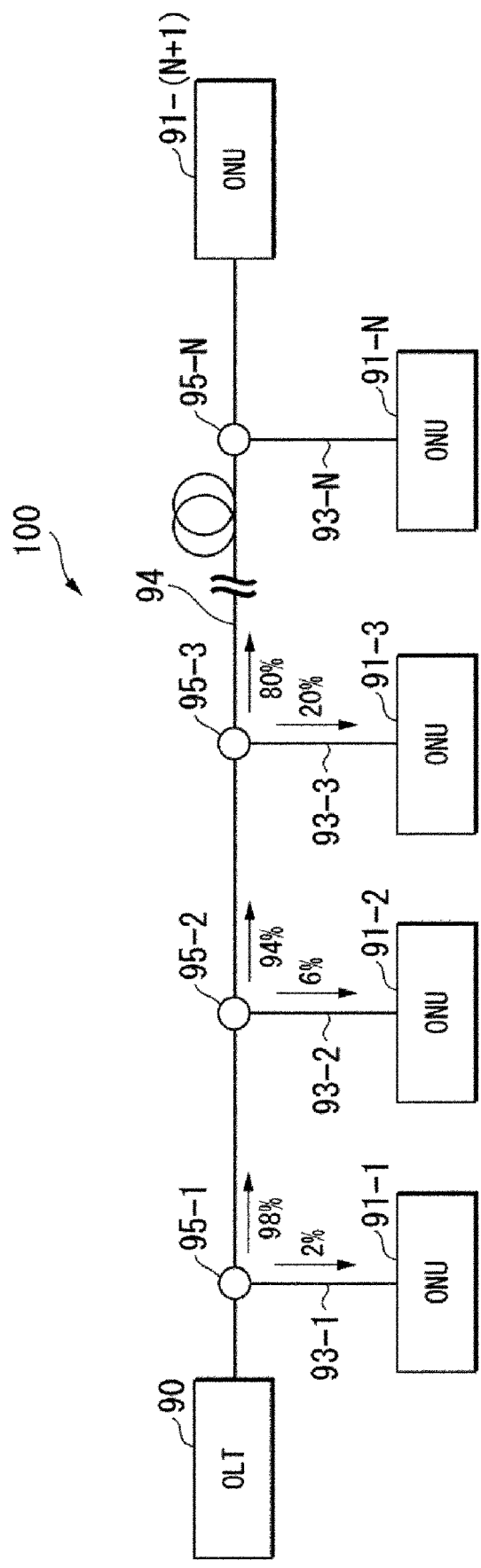
FIG. 11 is a diagram showing an optical communication system using an asymmetrical optical splitter.
Figure 12:
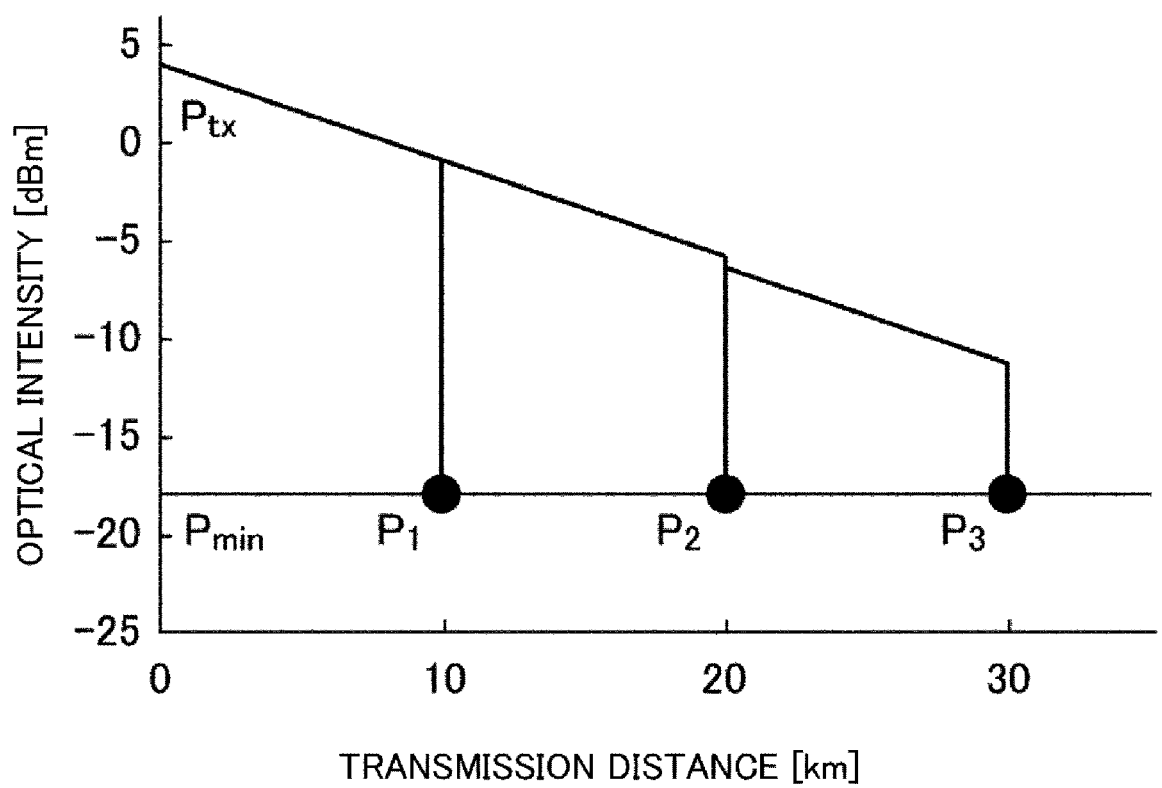
FIG. 12 is a graph representing a relation between a transmission distance and a light intensity in the optical communication system shown in FIG. 11.

FIG. 8 is a flowchart showing operations of the optical power feeding unit 10 according to the second embodiment for checking the charging rate of the power storage unit 126. For simplification, the operations of the optical power feeding unit 10 and the drop unit 12 in the case in which there is one drop unit 12 will be described.

At the time of starting power feeding, the transmittance $T_1$ of the first optical splitter 121 of each drop unit 12 for the second optical multiplexer/demultiplexer 122 takes an arbitrary value not lower than the lower limit value L. First, the power-feed light generating unit 101 outputs power-feed light (step S300). The power-feed light is supplied to each drop unit 12 through a trunk fiber 14. A photoelectric conversion unit 125 of the drop unit 12 converts energy of the power-feed light into electric energy (step S401) and supplies the electric energy to the power storage unit 126. In this way, electricity is stored in the power storage unit 126 (step S402).

When the power-feed light generating unit 101 starts output of the power-feed light in step S300, the control signal generating unit 104 of the optical power feeding unit 10 transmits a control signal (a first control signal) (step S301). The control signal is multiplexed with the power-feed light by the fourth optical multiplexer/demultiplexer 105 and is supplied to the trunk fiber 12. A control signal is input to the branch ratio control unit 127 of the drop unit 12 (step S403). When the drop unit 12 is not in the sleep state, the branch ratio control unit 127 controls the branch ratio of the first optical splitter 121 on the basis of the control signal (step S404).

The optical fiber measuring unit 102 outputs measurement light. The measurement light is multiplexed with the power-feed light by the first optical multiplexer/demultiplexer 103 and is supplied to the trunk fiber 12. The backward scattered light according to the trunk fiber 12 is separated into backward scattered light of the power-feed light and backward scattered light of the measurement light in the first optical multiplexer/demultiplexer 103. The optical fiber measuring unit 102 measures transmittance $T_1$ (first transmittance) of the drop unit 12 on the basis of the backward scattered light of the measurement light (step S302).

Next, the control signal generating unit 104 transmits a control signal (a second control signal) (step S303). Thereafter, the control signal is input to the branch ratio control unit 127 in the same manner as after the control signal generating unit 104 transmits the first control signal (step S405). When the drop unit 12 is not in the sleep state, the branch ratio control unit 127 controls the branch ratio of the first optical splitter 121 on the basis of the control signal (step S406). In the branch ratio control unit 127, the optical fiber measuring unit 102 measures transmittance $T_1$ (second transmittance) of the drop unit 12 (step S304). The branch ratio indicated by the second control signal is different from the branch ratio indicated by the first control signal.

The charging rate determining unit 106 determines whether or not the first transmittance and the second transmittance are equal to each other (step S305).

In a case in which the first transmittance and the second transmittance are equal to each other (step S305: Yes), the charging rate determining unit 106 determines that the branch ratio control unit 127 is in the sleep state and determines that the charging rate of the power storage unit 126 is equal to or lower than a predetermined value (step S306). In a case in which the first transmittance and the second transmittance are different from each other (step S305: No), the charging rate determining unit 106 determines that the branch ratio control unit 127 controls the first optical splitter 121 and the charging rate is equal to or higher than the predetermined value (step S307). The optical fiber measuring unit 102 waits for a predetermined time (step S308).

When a predetermined elapses after the operation of step S406 is performed, the branch ratio control unit 127 controls the branch ratio of the first optical splitter 121 on the basis of the charging rate of the power storage unit 126 (step S407). after waiting for a predetermined time, the optical fiber measuring unit 102 measures transmittance $T_1$ (third transmittance) of the drop unit 12 (step S309). The third transmittance is determined in accordance with the branch ratio of the first optical splitter 121, and the branch ratio is a value determined in accordance with the charging rate of the power storage unit 126. Therefore, the charging rate determining unit 106 calculates a charging rate of the power storage unit 126 on the basis of the measured third transmittance (step S310). It is determined whether or not the charging of the power storage unit 126 has been completed from the charging rate calculated by the charging rate determining unit 106 (step S311). In a case in which the charging has been completed (Step S311: Yes), the power-feed light generating unit 101 ends output of the power-feed light (step S312). In a case in which the charging has not been completed (step S311: No), the processing is returned to step S301.

Although a case in which there is one drop unit 12 has been described above, the charging rates of power storage units 126 of a plurality of drop units 12 can be determined once. In this case, the optical power feeding unit 10 performs classification of whether the charging rate is equal to or lower than a predetermined value for each drop unit 12 using a result of measurement of the transmittance $T_1$. Further, in the second embodiment, although the branch ratio is controlled while the optical power feeding unit 10 feeds electric power by configuring the wavelengths of the control signal and the power-feed light to be different from each other, in another embodiment, the power-feed light may function as a control signal by modulating the power-feed light using the optical power feeding unit 10. In this case, the wavelength of the power-feed light coincides with the wavelength of the control signal.

<Action and Effects>

In this way, according to the second embodiment, the control signal generating unit 104 outputs two different kinds of control signals, and the optical fiber measuring unit 102 measures a loss in the drop unit 12 corresponding to each control signal. On the basis of two measured losses, it is determined whether or not the branch ratio control unit 127 controls the branch ratio of the first optical splitter 121. In a case in which the branch ratio control unit 127 performs control, the charging rate of the power storage unit 126 is determined by measuring a loss in the drop unit 12 again after a predetermined time. In accordance with this, the charging rate of the power storage unit 126 of the drop unit 12 can be checked more finely in the optical power feeding unit 10.

Third Embodiment

An optical power feeding unit 10 according to a third embodiment measures a connection loss in a drop unit 12. The connection loss is a loss of an optical signal caused by an occurrence of a deviation or a gap in a connection part of the optical fiber. In a case in which the connection loss is large, a branch ratio measured by a optical fiber measuring unit 102 may be greatly different from an actual branch ratio of a first optical splitter 121, and it becomes an obstacle for accurately determining completion of charging. Therefore, in the third embodiment, the connection loss in the drop unit 12 is measured before the optical power feeding unit 10 measures a branch ratio of the drop unit 12, and then the branch ratio measured using the connection loss is corrected, whereby a more accurate value is calculated.

When the branch ratio control unit 127 can control the branch ratio of the first optical splitter 121, the control signal generating unit 104 transmits a control signal and sets the branch ratio of the first optical splitter 121 to a certain value (a branch ratio for which the transmittance $T_1=\alpha$). Thereafter, the optical fiber measuring unit 102 measures a loss in the drop unit 12. Here, a loss measured here is assumed to be β. β is a loss obtained by combining a loss due to branching of the first optical splitter 121 and the connection loss in the drop unit 12. The optical power feeding unit 10 calculates a connection loss from α and β. After measuring a connection loss, the optical power feeding unit 10 corrects the loss measured by the optical fiber measuring unit 102 using the connection loss, thereby calculating the branch ratio of the first optical splitter 121.

<Action and Effects>

In this way, according to the third embodiment, the optical power feeding unit 10 calculates a connection loss and corrects the loss to be measured. In this way, the optical power feeding unit 10 can more accurately obtain the branch ratio of the first optical splitter 121 of the drop unit 12.

Fourth Embodiment

A branch ratio control unit 127 according to a fourth embodiment performs control such that the transmittance T1 of the first optical splitter 121 being 0 and the transmittance $T_1$ being larger than 0 are periodically repeated when the charging rate of a power storage unit 126 becomes 100%.

By detecting that the branch ratio is periodically repeated by an optical fiber measuring unit 102, an optical power feeding unit 10 determines that charging of the power storage unit 126 has been completed. Each branch ratio control unit 127 detects a change in the intensity of power-feed light received by the power storage unit 126, whereby periods of changes in the branch ratio of the first optical splitters 121 are synchronized.

When the optical power feeding unit 10 determines that the charging rates of all the power storage units 126 become 100%, a control signal generating unit 104 transmits a control signal at a timing at which the transmittance $T_1$ of the first optical splitter 121 becomes larger than 0. When the control signal is received, the branch ratio control unit 127 sets the transmittance $T_1$ of the first optical splitter to a lower limit value L.

<Action and Effects>

In this way, according to the fourth embodiment, the branch ratio control unit 127 performs control such that the transmittance $T_1$ of the first optical splitter 121 being 0 and the transmittance $T_1$ being larger than 0 are periodically repeated when the charging rate of the power storage unit 126 becomes 100%. In addition, the branch ratio control unit 127 receives a control signal at a timing at which T1>0. In accordance with this, charging efficiency of the optical power feeding system 1 can be improved, and the drop units 12 can be controlled.

Other Embodiments

Although the embodiments of the present invention have been described in detail above with reference to the drawings, a specific configuration is not limited to those described above, and various designs and the like can be made in a range not departing from the spirit and scope of the present invention.

REFERENCE SIGNS LIST 1 optical power feeding system
10 optical power feeding unit
12 drop unit
13, 93 branch fiber
14, 94 trunk fiber
101 power-feed light generating unit
102 optical fiber measuring unit
103 first optical multiplexer/demultiplexer
104 control signal generating unit
105 fourth optical multiplexer/demultiplexer
106 charging rate determining unit
121 first optical splitter
122 second optical multiplexer/demultiplexer
123 terminator
124 third optical multiplexer/demultiplexer
125 photoelectric conversion unit
126 power storage unit
127 branch ratio control unit
128 fifth optical multiplexer/demultiplexer
90 OLT
91 ONU
92 symmetrical optical splitter
95 unsymmetrical optical splitter

The invention claimed is:

1. An optical feeding system comprising:
an optical power feeding unit; and
a plurality of drop units configured to be able to receive light from the optical power feeding unit as an input, branch the input light, and output branched light, wherein the optical power feeding unit includes a power-feed light generating unit that outputs power-feed light, and wherein the drop units each include:
an optical splitter that branches the power-feed light into first branch light and second branch light and outputs the second branch light to another drop unit;
a photoelectric conversion unit that performs photoelectric conversion of the first branch light; and
a branch ratio control unit that is driven by electricity generated by the photoelectric conversion and controls a branch ratio that is a ratio between the first branch light and the second branch light.

2. The optical feeding system according to claim 1, wherein the branch ratio control unit controls the optical splitter such that transmittance that is a ratio of an intensity of the first branch light to an intensity of the power-feed light is equal to or higher than a predetermined value.

3. The optical feeding system according to claim 1,
wherein the drop units each include a power storage unit that stores the electricity generated by performing photoelectric conversion of the power-feed light,
wherein the branch ratio control unit of the drop unit sets the branch ratio according to a charging rate of the power storage unit, and
wherein the optical power feeding unit includes:
an optical fiber measuring unit that measures the branch ratio; and
a charging rate determining unit that determines a charging rate of the power storage unit from the branch ratio.

4. The optical feeding system according to claim 3, wherein the optical power feeding unit further includes a control signal generating unit that transmits an optical signal as a control signal for controlling the branch ratio to the drop units, and
wherein the charging rate determining unit determines whether or not the branch ratio control unit controls the branch ratio on the basis of the branch ratio.

5. The optical feeding system according to claim 3, wherein the optical power feeding unit calculates a loss of an optical signal in the drop units and corrects a branch ratio to be measured on the basis of the loss.

6. The optical feeding system according to claim 1, wherein the branch ratio control unit performs control of the optical splitter such that transmittance that is a ratio of an intensity of the first branch light to an intensity of the power-feed light is repeated to have a different value for each predetermined time when charging of the power storage unit is completed.

* * * * *